UNITED STATES PATENT OFFICE.

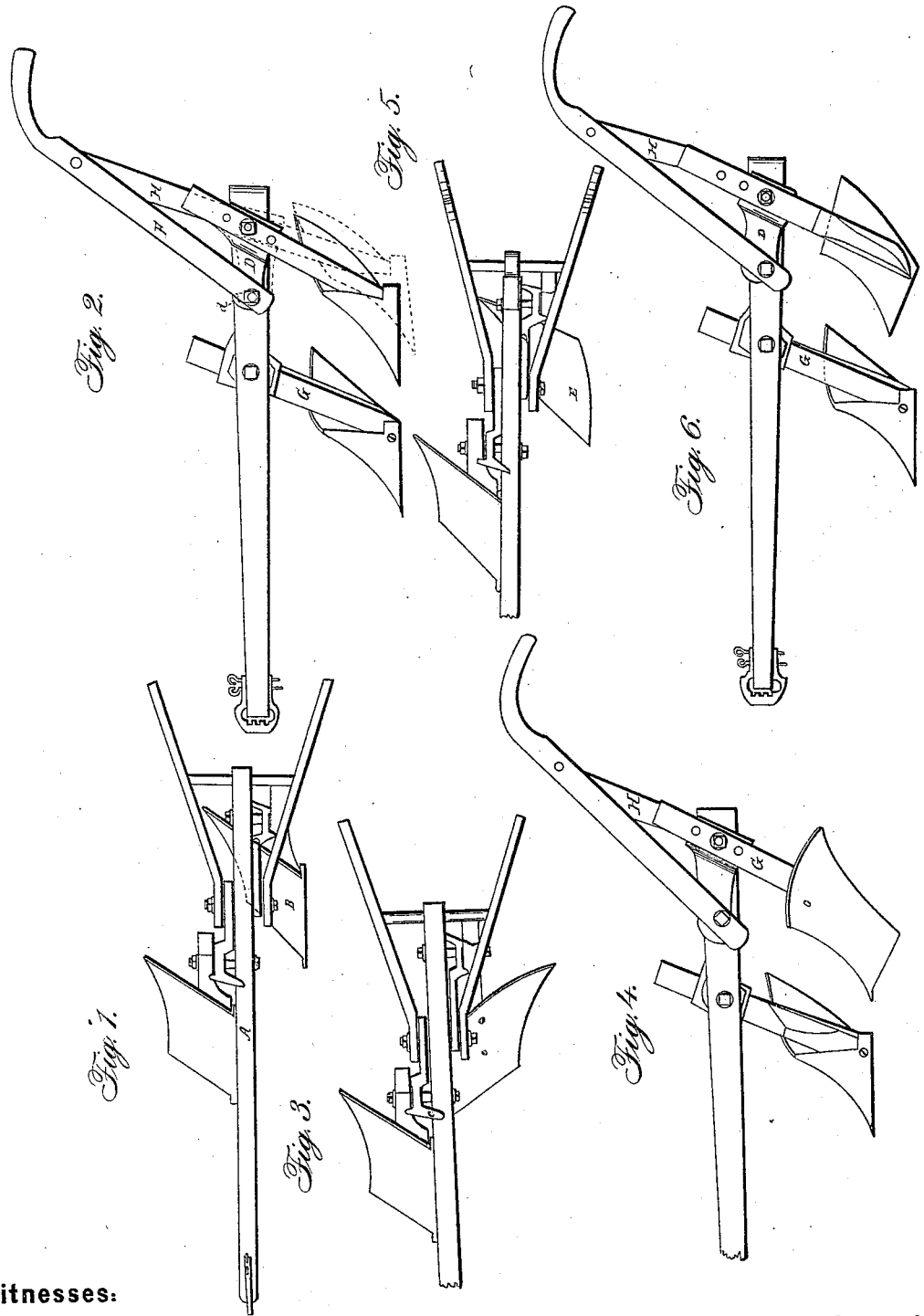
G. W. N. YOST.
Cultivator.
No. 29,211.
2 Sheets—Sheet 1.
Patented July 17, 1860.
Witnesses:
Inventor:

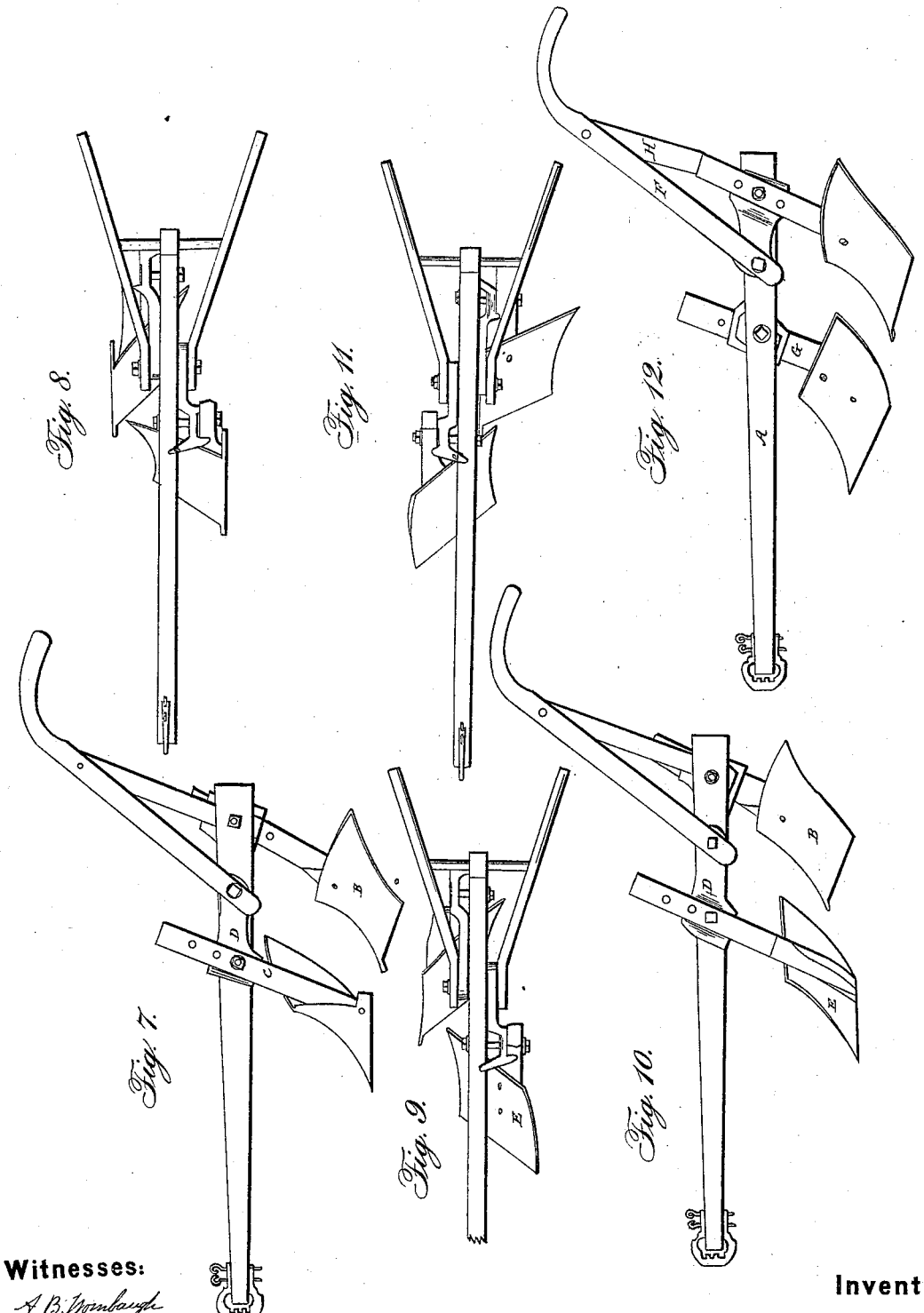

G. W. N. YOST, OF YELLOW SPRINGS, OHIO.

IMPROVEMENT IN COTTON-CULTIVATORS.

Specification forming part of Letters Patent No. 29,211, dated July 17, 1860.

*To all whom it may concern:*

Be it known that I, G. W. N. YOST, of Yellow Springs, in the county of Greene and State of Ohio, have invented a new and useful Improvement in Cotton Plows and Cultivators; and I do hereby declare that the following is a full and exact description thereof, reference being had to the accompanying drawings, and to the letters of reference marked thereon.

In the cultivation of cotton-plantations various operations must be performed with the plow. These several operations require very different plows, and heretofore it has been necessary for cotton-planters to purchase and keep in repair a large number and variety of plows to perform the work of the plantation.

The object of my invention is to provide in one and the same machine a plow capable of modification, so as to be adapted to the different kinds of plowing or cultivation necessary for the cotton-plantation.

The body of the implement, as shown in every figure of the accompanying drawings, consists of the beam A, the handles F, the standard H, and two adjustable cast-iron sockets, D. I employ in my machine two right-hand plows B, one left-hand plow B, and one scraper, E, all attached to standards G. By exchanging or moving these plows and scrapers the following modifications of the same machine are produced:

Figures 1 and 2 of the accompanying drawings represent two right-hand plowshares on one beam. This machine is intended for bedding up cotton. Each of these plows is intended to cut a furrow about eight inches wide. This implement may be drawn by a single mule.

In Figs. 3 and 4 are shown a right-hand plowshare and a left-hand on one beam. This machine is also intended for bedding up and cultivating cotton. It answers the purpose of the common sweep.

Figs. 5 and 6 show a right-hand plow and scraper. The plow is in front and turns the furrow, while the scraper is behind, and is intended to work near the rows of cotton without disturbing the roots of the plants.

Figs. 7 and 8 represent a subsoil ditching-plow, forming a perfect machine for opening water-courses between cotton-rows.

Figs. 9 and 10 show a left-hand machine for scraping and hilling cotton, the scraper-share being in front for scraping the dirt away from the cotton, while the plowshare follows in order to throw the fresh soil up to the plants.

In Figs. 11 and 12 the scraper is placed in front and the share in the rear, the latter covering the grass scraped off by the former.

By the foregoing description it will be seen that my implement is adapted to every operation required of the plow in cultivating cotton. By exchanging the plows and scrapers six different modifications are obtained.

A very important feature of my machine is the peculiar adjustable socket D. This socket D is attached to the beam by two bolts, which also secure the handles and the standard in place. The socket has two lips embracing the standard. It also has a projection, $e$, overlapping the beam and preventing the socket from turning. One end of this socket D has a slot, $d$, Fig. 2, by means of which the socket is made adjustable, as shown in red lines, Fig. 2. By this arrangement the two shares can always be adjusted so as to run at the same depth, the point of each share being elevated or depressed, according to the varying position of the beam and line of draft. Without such adjustability one share is liable to run deeper than the other; but with my arrangement both shares can easily be made to run at the same depth.

I intend to make application for a separate patent broadly covering this socket as applied to various plows and cultivators; but in this present application I claim this feature only so far as it is an essential part of the above-described implement.

I do not claim in this application any of the separate modifications herein set forth; but What I do claim, and desire to secure by Letters Patent of the United States, is—

The combination and arrangement of the body of the implement and its movable plows B, scraper E, and standards G, constructed as herein described, whereby it is readily adapted to receive, in turn, the several plows and scrapers in order to perform the various modes of cultivation specified.

G. W. N. YOST.

Witnesses:
 EDM. F. BROWN,
 DANIEL BREED.